United States Patent
Yoshikawa et al.

(10) Patent No.: US 6,215,936 B1
(45) Date of Patent: Apr. 10, 2001

(54) LIGHTGUIDE HAVING TRAPEZOIDALLY-SHAPED MAIN BODY WITH A LEVEL SURFACE AT AN ANGLE TO A REAR SURFACE

(75) Inventors: Toshiyuki Yoshikawa, Tokyo; Osamu Shinji; Toshitaka Kunisawa, both of Niigata; Kouzo Yasuda, Kashima-gun, all of (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/147,594
(22) PCT Filed: May 29, 1997
(86) PCT No.: PCT/JP97/01817
  § 371 Date: Jan. 29, 1999
  § 102(e) Date: Jan. 29, 1999
(87) PCT Pub. No.: WO98/54605
  PCT Pub. Date: Dec. 3, 1998

(51) Int. Cl.[7] .................................................. G02B 6/34
(52) U.S. Cl. .................... 385/133; 385/901; 385/146; 362/302; 362/309
(58) Field of Search .................... 385/133, 901, 385/146, 147; 362/554, 556, 560, 26, 302, 309, 339, 551

(56) References Cited

U.S. PATENT DOCUMENTS 5,776,636   7/1998   Kunisawa et al. ......................... 430/5
5,854,872 * 12/1998  Tai ....................................... 385/133
5,894,539 *  4/1999  Epstein ................................. 385/133

* cited by examiner

Primary Examiner—Phan T. H. Palmer
(74) Attorney, Agent, or Firm—Oblon, Spivak, McClelland, Maier & Neustadt, P.C.

(57) ABSTRACT

A transparent lightguide (3) which guide light at least from one side end plane is characterized in that a large number of speckled, solid-line shaped or broken-line shaped protruding patterns whose cross-sectional width W ($\mu$m) at a cross section perpendicular to the axis of a linear light source is $10 \leq W \leq 200$ are arranged on a light emitting surface at a low density in a region close to the linear light source and at a high density in a region far from the linear light source so as to make the luminance distribution of the light emitted from the light emitting surface approximately uniform. Here, the cross section of the protruding pattern is preferable to be approximately trapezoidal while having a straight part partially and the ratio H/W to be $0.2 \leq H/W \leq 1.0$, where W and H denote cross-sectional width and height of the protruding pattern, respectively, or the cross section of the protruding pattern is preferable to be approximately circular-arc and the ratio H/W to be $0.2 \leq H/W \leq 0.5$, where W and H denote cross-sectional width and height of the protruding pattern, respectively.

3 Claims, 9 Drawing Sheets

LIGHTGUIDE HAVING TRAPEZOIDALLY-SHAPED MAIN BODY WITH A LEVEL SURFACE AT AN ANGLE TO A REAR SURFACE

TECHNICAL FIELD

The present invention relates to a lightguide for a surface light source for use in a liquid crystal display and the like. The present inventive lightguide may be used effectively as a rear surface illuminator of a liquid crystal display of a word-processor, a personal computer, a thin television set and the like.

BACKGROUND OF THE INVENTION

A surface light source device fitted with a so-called edge-light type lightguide arranged so as to illuminate by inputting light from a side end plane of a transparent plate and by emitting the light from the other plane thereof (light emitting surface) is used as a rear surface illuminator of a liquid crystal display of a word-processor, a personal computer, a thin television set and the like.

In order to emit primary light inputted from the side end plane of the lightguide uniformly and efficiently from the whole light emitting surface of the lightguide, it is necessary to arrange the lightguide such that its scattering-reflecting capability is low around a light source and its light diffusing-reflecting capability is high at the region farthest from the light source and to distribute the light such that the most of the inputted primary light is emitted from the emitting surface in scattering and reflecting the light guided to the lightguide in the direction perpendicular to its traveling direction. Then, a variety of principles and processing methods for giving such scattering and reflecting capability have been proposed as described below and part of them have been put into practical use.

(1) Those Characterized Mainly by Rough Surface:

There are ones in which the whole light emitting surface or the surface facing thereto is roughened (JP-A-3-118593, JP-A-118248, etc.), in which the roughness of the rough surface is changed (JP-A-63-168604, etc.) or in which speckled or linear rough surface patterns are disposed and formed by changing its areal density (JP-A-4-162002). The surface is roughened by sand-blasting or chemically etching a die and the surface rough patterns are formed by combining photo-etching and sand-blasting (JP-A-4-52286).

(2) Those in Which Scattering Reflector is Applied:

Those in which a scattering-reflecting substance containing white paint or particles is applied in a meshed dot or linear pattern on the rear surface facing to the light emitting surface by means of screen printing or the like (JP-A-57-12838, JP-A-1-245220, etc.). Its manufacturing process includes two steps of forming a specular plate having no pattern and of printing the patterns.

(3) Those Characterized Mainly by Diffusion of Bulk:

There have been disclosed ones in which lightguide bulk resin itself is adopted as a light diffusing-scattering substance by mixing light scattering particles, by blending non-compatible polymer or by co-polymerization (JP-A-1-172801, JP-A-2-221924, JP-A-5-249319, JP-A-6-186560, etc.).

(4) Those Caused by Protruding or Concave Patterns:

These are divided roughly into the following three types. These are fabricated by machining a lightguide itself or a molding die by machine cutting, laser processing, die etching or the like.

1) Concave Patterns:

Ones in which concave patterns are disposed on a light emitting surface or on a surface facing thereto on the datum plane. There are, for example, ones having one-dimensional linear triangle grooves (JP-A-2-165504, JP-A-6-3526), rectangular grooves (JP-A-6-123810, JP-A-6-265731, etc.), semi-circular grooves (JP-A-5-79537U), broken-line shaped triangular grooves (JP-A-5-196936, JP-A-5-216030, etc.) and others. There are also those having two-dimensional conical or pyramid engraving (JP-A-4-278922), semispherical engraving (JP-A-6-289393, etc.) and cylindrical engraving (JP-A-1-145902U). There have been also proposed one in which the inner surface of a concave portion of the pattern is roughened (JP-A-4-355408, JP-A-5-94802U, etc.).

2) Protruding Patterns:

Ones in which protruding patterns are disposed on a light emitting surface or on a surface facing thereto on the datum plane. There are, for example, ones having one-dimensional linear triangle protrusions (JP-A-5-313163, JP-A-6-75123), rectangular protrusions (JP-A-5-79537U) and semi-circular protrusions (JP-A-6-281928). There is also one having two-dimensional semispherical protrusions (JP-A-5-79537U, JP-A-6-281929, etc.). There are also ones in which those protruding parts are roughened (JP-A-5-94802U, JP-A-6-186562, etc.).

3) Concave and Protruding Patterns:

There are ones which have no flat plane on a light emitting surface or on a surface facing thereto and in which one-dimensional saw-tooth patterns or two-dimensional grid patterns are disposed. There are, for example, ones having the one-dimensional saw-tooth patterns (JP-A-64-11203, JP-A-6-250024, etc.) and the two-dimensional grid patterns (JP-A-62-278505, JP-A-3-189679, etc.) and ones whose surface is roughened as a whole (JP-A-6-342159, JP-A-6-123885, etc.).

In addition to the demands on high luminance and high uniformity ratio of illuminance of the past, the demand on a large screen, thin-type, light-weight and low power consumption display is growing more and more lately. The trend is now shifting from a plate-like lightguide which has been put into practical use mainly by the printed patterns of (2) of the past to a tapered (wedge) type lightguide which is thinner and lighter. Then, the pattern printing step which has been required in the technology of (2) described above has become unnecessary and injection molding which allows scattering reflection patterns to be formed in the same time is considered to be desirable in terms of the cost.

From this aspect, the above-mentioned methods (1) through (4) have had the following various problems, respectively.

Although those having the uniform rough surface by the method (1) can be mass-produced by injection molding by using a die, it has had problems that the die is complicated because the die must be formed into a complicated curved wedge shape such that region where primary light enters is fully thickened and the region distant from the light source is thinned in order to attain uniform luminance as a surface light source, the degree of freedom of the shape of the lightguide is restricted and there is a limitation in increasing the area and thinning of the lightguide in principle. Further, although there has been a proposal of changing the surface roughness, it is very difficult to realize that. Meanwhile, although the method of distributing the rough surface as speckle or linear patterns is a relatively excellent method which allows the shape of the lightguide to be freely formed and the luminance to be uniformed in the pattern design, it is risky because of unstable elements in the die fabrication process such as variation between accuracy of photo-etching in forming the patterns and the surface roughening process such as blast in the next step in creating the die.

Although the printing method (2) has been the method put into the practical use most among the conventional plate type lightguides, it has had a problem, as a first problem, that it does not have a merit in terms of the cost as compared to the method of forming patterns in the same time by injection molding because the pattern printing step is a separate step. Further, it has had a problem that the pitch of dots of the scattering reflection patterns cannot be made smaller than around 1 mm (see JP-A-5-100118) due to the limit of the printing accuracy (see JP-A-4-289822). Further, due to this problem of the printing accuracy, the reproducibility of minimum points and minimum lines is low during the pattern printing, thus lowering the production yield and increasing the cost (see JP-A-3-9304, JP-A-4-278922). Still more, in terms of its performance, a difference of brightness occurs locally between regions where the pattern exists and where the pattern does not exist because the pattern is rough, thus causing luminous unevenness, so that it is a general practice to uniform the local unevenness of luminance caused by the rough pattern by providing a diffusing plate or a diffusing sheet having a high diffusing efficiency on the emitting surface side of the lightguide. However, because the diffusing plate or the diffusing sheet having a high diffusing efficiency has a low total ray transmission factor, it causes loss, thus lowering the luminance (see JP-A-5-100118, JP-A-6-265732).

In case when rough patterns are disposed orderly, moire occurs between a prism sheet or a liquid crystal panel disposed in order to increase luminance in the vertical direction on the emitting surface side of the lightguide due to the local luminous unevenness. Although the diffusing plate or the diffusing sheet having a high diffusing efficiency has been used as described above in order to prevent that, the luminance has been lowered due to that. Although methods of setting pattern intervals at random (see JP-A-5-313017 and JP-A-6-242442) or of disposing the patterns obliquely with respect to a ridge-line direction of the prism sheet (see JP-A-5-257144 and JP-A-6-230228) have been proposed as the other methods, they make it difficult to design or to assemble.

Although the method (3) allows mass-production by injection molding or the like and is anticipated to cause no local luminous unevenness at all due to the pattern in principle, it is considered to be difficult to achieve the uniform luminance just by the bulk scattering method. Further, it is not easy to give the distribution of the light diffusing performance to the lightguide bulk itself and is difficult to mass-produce. Further, it is necessary to change the thickness of tapered shape or the like or to create concave and protruding patterns to realize the uniform luminance by a resin material of uniform diffusing agent. Thus, there is a possibility that it becomes complicated as it is required to use other means for achieving the uniform luminance or that the restriction on the shape of the lightguide becomes a big problem.

The method (4) is an excellent method in terms of mass-producibility when press or injection molding is used by using a die. As means for achieving the concave and protruding patterns, methods of using mechanical cutting, laser processing or chemical etching have been disclosed. However, as for the pattern shaping accuracy, the dimensional accuracy and the roughness of the plane where the patterns are created, all of the processing methods have had considerable difficulties and have been risky in terms of the processing stability, reproducibility and cost when the lightguide has minute patterns and has a large area. Lightguides which have been put into practical use so far have been small lightguides of several inch in size having pattern pitch of around 1 mm and the problem of the pattern roughness in (2) still exists. Further, ones in which a relatively large irregular plane is created and the irregular plane is roughened further has had problems that variation caused in the roughening process adds on the problem of the accuracy in creating the irregular plane, thus causing unstableness in fabricating a die and causing a problem in terms of the cost in fabricating the die.

Accordingly, it is an object of the present invention to provide a bright, uniform, thin and large-area lightguide causing no local luminous unevenness or no luminous unevenness on the whole light emitting surface by disposing patterns which emit primary light incident on the lightguide efficiently from a light emitting surface on the emitting surface side and by refining the patterns.

SUMMARY OF THE INVENTION

In order to achieve the above-mentioned object, an edge-light type lightguide of the present invention has the following characteristics.

That is, a transparent lightguide which guides light at least from one side end plane is characterized in that a large number of speckled, solid-line shaped or broken-line shaped protruding patterns whose cross-sectional width W($\mu$m) at a cross section perpendicular to the axis of a linear light source is $10 \leq W \leq 200$ are arranged on a light emitting surface at a low density in a region close to the linear light source and at a high density in a region far from the linear light source so as to make the luminance distribution of the light emitted from the light emitting surface approximately uniform. Here, the cross section of the protruding pattern is preferable to be approximately trapezoidal while having a straight part partially and the ratio H/W to be $0.2 \leq H/W \leq 1.0$, where W and H denote cross-sectional width and height of the protruding pattern, respectively, or the cross section of the protruding pattern is preferable to be approximately circular-arc and the ratio H/W to be $0.2 \leq H/W \leq 0.5$, where W and H denote cross-sectional width and height of the protruding pattern, respectively.

DETAILED DESCRIPTION OF THE PREFERRED EMBODIMENTS

The present invention will be explained below in detail.

Figure 1:
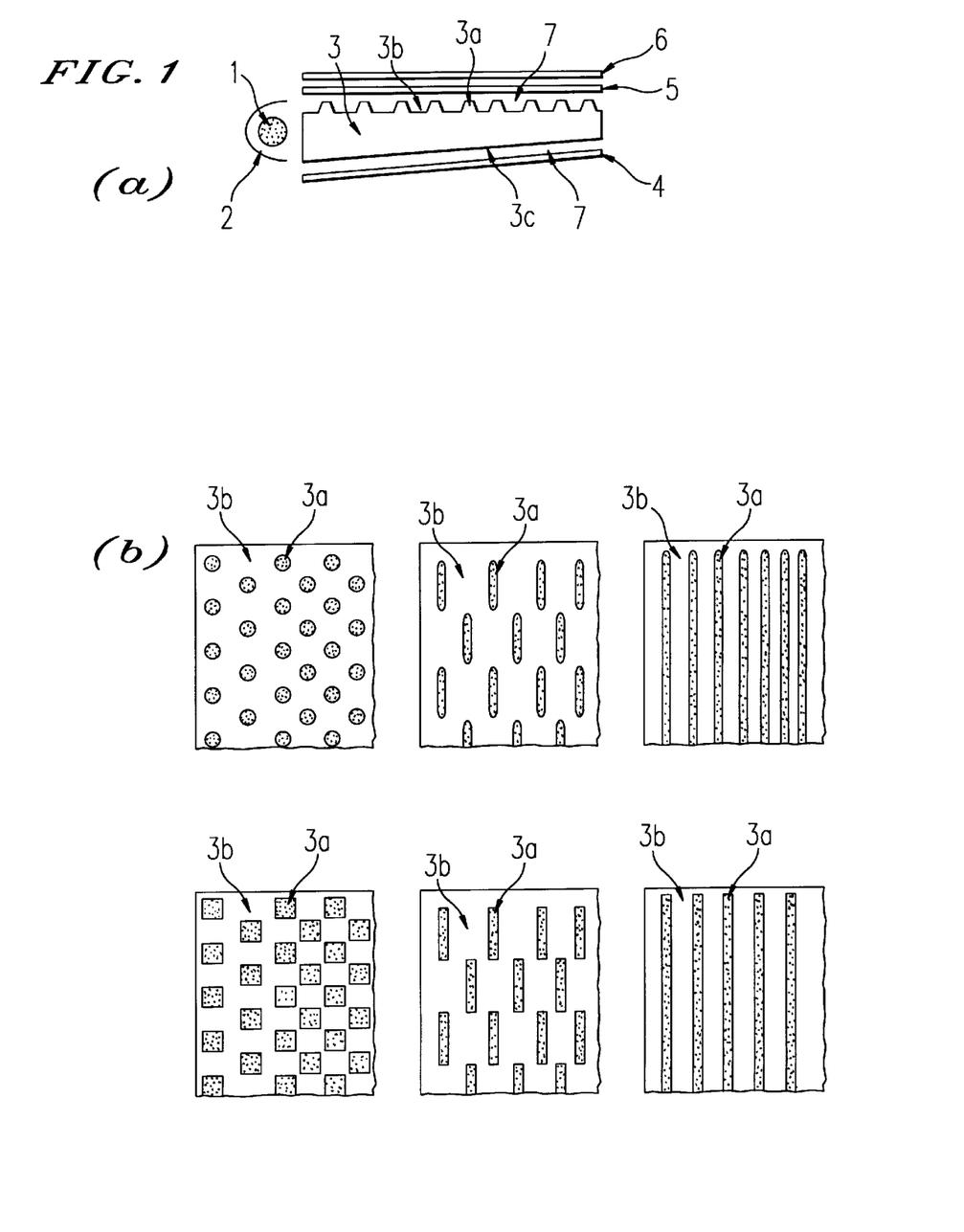
FIGS. 1a–1b show one structural example of an edge-light type lightguide illuminator of the present invention.

FIG. 1 shows one embodiment of the present invention, wherein FIG. 1(a) is a section view of a cross section thereof perpendicular to an axis of a linear primary light source 1. In the figure, protruding patterns 3a having approximately a trapezoidal shape are provided on emitting surfaces 3a and 3b which are the emitting surfaces of a lightguide 3 at a low density at the region close to the primary light source 1 and at a high density at the region far therefrom. The light source 1 is not limited to be an one-lamp type and may be a two-lamp type in which lights are disposed so as to face each other. Or, an L-shaped light source may be used and light may be guided from two end planes perpendicular to each other. A light diffusing plate or a diffusing sheet 5 is disposed on the light emitting surfaces 3a and 3b via an air layer 7 and a reflecting plate or a reflecting sheet 4 is disposed on the rear surface 3c via another air layer 7. FIG. 1(b) is a plan view of the light emitting surfaces 3(a) and 3(b) of the lightguide 3 and illustrates those having the speckled (upper and lower figures on right-hand side of FIG. 1(b), chain line-shaped (upper and lower figures in middle of FIG. 1(b) and linear (upper and lower figures on left-hand side of FIG. 1(b) patterns. The speckled pattern is not limited to being circular and may be polygonal. The chain line may be one in which solid lines having round ends are connected or one in which rectangular solid lines are connected. The shape of the large number of patterns seen plan-wise is not confined to be the same. The specks, chain lines and straight line patterns may be combined or the size and the width of the plurality of patterns may be changed. As the transparent material of the lightguide, polystyrene, poly-carbonate, ABS resin or light scattering resin in which hetero-polymers are distributed are used beside acryl.

Figure 2:
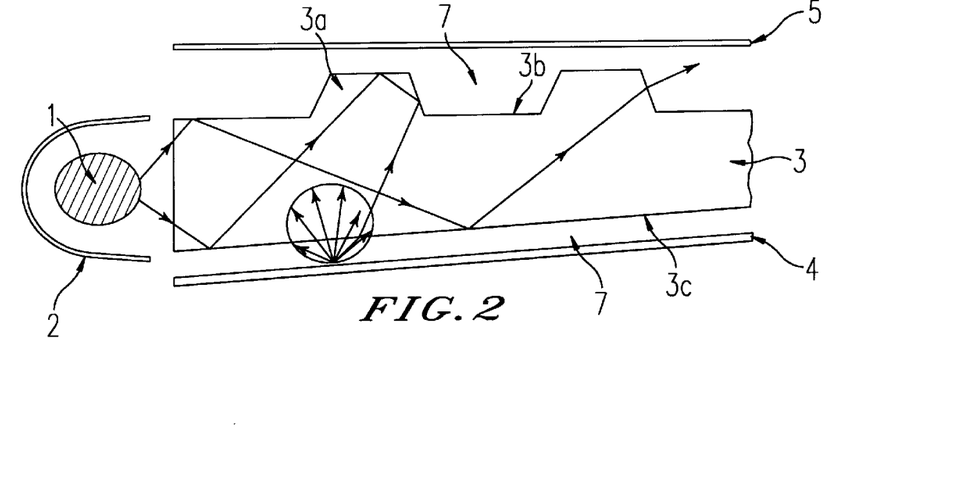
FIG. 2 is a partially enlarged explanatory diagram of the edge-light type lightguide of the present invention.

FIG. 2 is a partially enlarged view of the cross section shown in FIG. 1, wherein the light rays from the primary light source 1 propagate within the lightguide 3 while being totally reflected by the level surface 3b of the emitting surface and the rear surface 3c of the lightguide 3. The light rays incident on the protruding pattern 3a on the emitting surface are reflected and refracted by the pattern and part thereof is emitted directly from the pattern and the other part thereof is emitted from the emitting surfaces 3a and 3b by being reflected again by the reflection sheet 4 after being reflected by the rear surface thereof.

Figure 3:
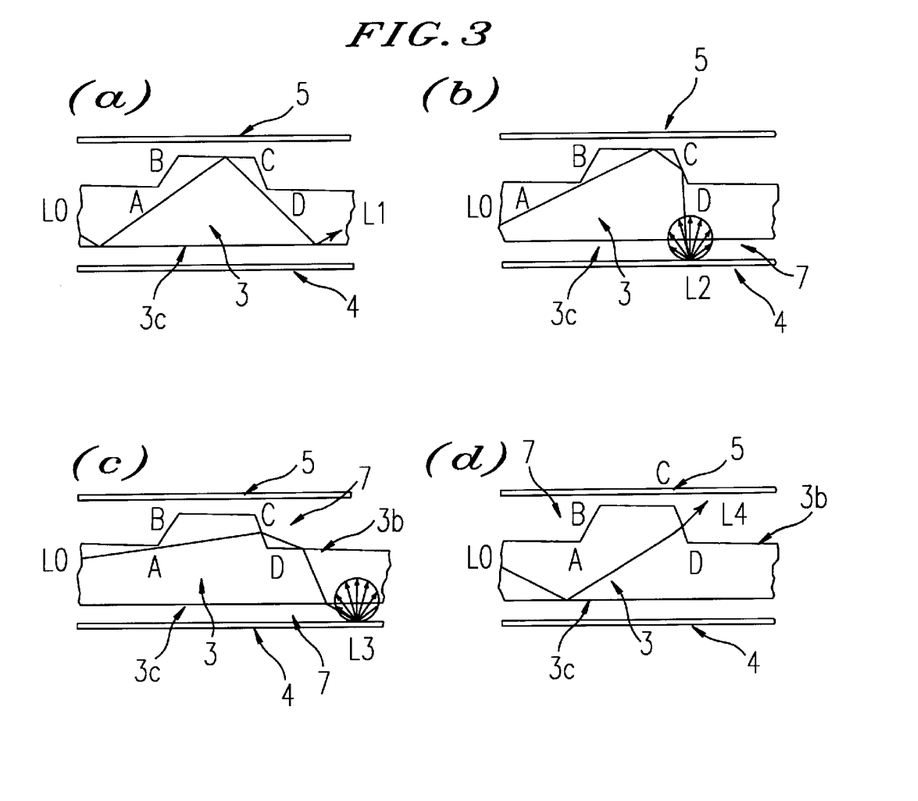
FIGS. 3a–3c are a diagram classifying scattering reflection rays of protruding patterns whose cross section is a circular arc.

(1) About Shape of Patterns:

FIG. 3 classifies behaviors of the reflection and refraction, i.e., scattering reflection, of the incident ray in unit pattern in one example of the pattern whose cross section protrudes in a trapezoidal shape. A light ray L0 inputted from an edge AD of the pattern 3a whose cross section is trapezoidal (trapezoid ABCD) as shown in FIG. 3(a) is totally reflected by edges AB, BC and CD, is returned to the lightguide via the edge AD as it is and becomes propagating light by totally being reflected again by the rear surface 3c within the total reflection critical angle. This light ray is not emitted. The pattern by which the ratio of the light ray L1 which does not contribute to the emission among the total light rays L0 incident on the pattern as described above can be said as a pattern whose scattering and emitting efficiency is low. However, because this light ray L1 becomes the propagating light again, it causes no loss as described later.

In FIG. 3(b), although the pattern incident light L0 repeats total reflection by the trapezoid ABCD and returns to the lightguide 3 via the edge AD, it becomes a light ray L2 which is emitted from the rear surface 3c by exceeding the critical angle. Because there exists the reflection sheet 4 on the rear surface 3c via the air layer 7, the light ray L2 is reflected by the reflection sheet 4 and becomes an effective light ray which is emitted from the emitting surface by crossing the lightguide 3. However, the reflection sheet 4 provided on the rear surface is a diffuse reflection sheet or a specular reflection sheet on which metal is evaporated and loss of light is inevitable when such reflector is used. Firstly, the loss occurs due to reflection loss of the reflection sheet itself. When the reflection sheet is the diffusion reflection sheet, the reflectance of the reflection sheet itself is not 100% and it reflects light evenly not only in the vertical direction but also in the horizontal direction of the reflection sheet, so that the loss occurs because not all of the reflected light can enter the lightguide again. When the reflection sheet is the metal specular reflector, its reflectance is 80 to 90% in general and the absorption loss of the reflector itself is also large. Secondly, there exists a problem of reflection loss at the interface of the lightguide 3 and the air layer 7 having different refractive indices. For instance, when light rays pass vertically through the interface of the lightguide made of acrylic resin (refractive index: 1.49) and air (refractive index: 1.00), reflection occurs at least by about 4% at one interface and by about 8% at two interfaces. It becomes greater when the light ray passes not vertically therethrough. When the light ray L2 emitted to the rear surface is reflected by the reflection sheet 4 and is emitted from the emitting surface, it passes through the three interfaces. Among the interfacial reflection rays, the ray heading toward the emitting surface is effectively used, much of them become stray light which has lost its directionality, thus becoming a loss which cannot be utilized. That is, the light ray L4 in FIG. 4(b) is a scattering reflection ray whose ray utility factor is low and a pattern which causes much L4 is a pattern whose ray utility factor is low and which causes a large loss.

In FIG. 3(c), while the incident light L0 is emitted to the air layer 7 once by being refracted and transmitting from the edge CD of the trapezoid ABCD, it enters the level surface 3b of the reflecting and scattering surface again because it heads downward. Because the emitting surface 3b and the rear surface 3c are almost parallel each other, this light ray is emitted from the rear surface 3c, thus becoming L3, reflected again by the reflection sheet 4 and is emitted from the emitting surface, thus becoming an effective light ray. However, it causes a great loss similarly to L2 described above because it causes loss at the reflection sheet and passes through five interfaces having different refractive indices similarly to L2.

In FIG. 3(d), the incident light L0 becomes an effective light ray which is refracted and transmits at the edge CD of the trapezoid ABCD and which heads above the emitting surface as L4. This scattering reflection light L4 causes no loss at the reflection sheet and passes through the interfaces having different refractive indices least. That is, L4 is a scattering reflection ray whose ray utility factor is the highest because it is emitted directly from the emitting surface and a pattern which causes such rays more is preferable most.

While the case when the cross section of the pattern protrudes in the trapezoidal shape has been explained above, the same applies also when the cross section protrudes in circular arc. The scattering reflection performance and the ray utility factor of unit pattern may be evaluated by studying the ratio of the incident light ray L0 scattered and reflected into L1, L2, L3 and L4 per one unit pattern. A pattern which increases the ratio of the scattering reflection rays L2+L3+L4 with respect to the total ray L0 incident on the pattern is a pattern having a higher scattering reflection efficiency. Specifically, the larger the ratio of the scattering reflection ray L4, the smaller the loss is and the higher the ray utility factor of the pattern is.

Figure 4:
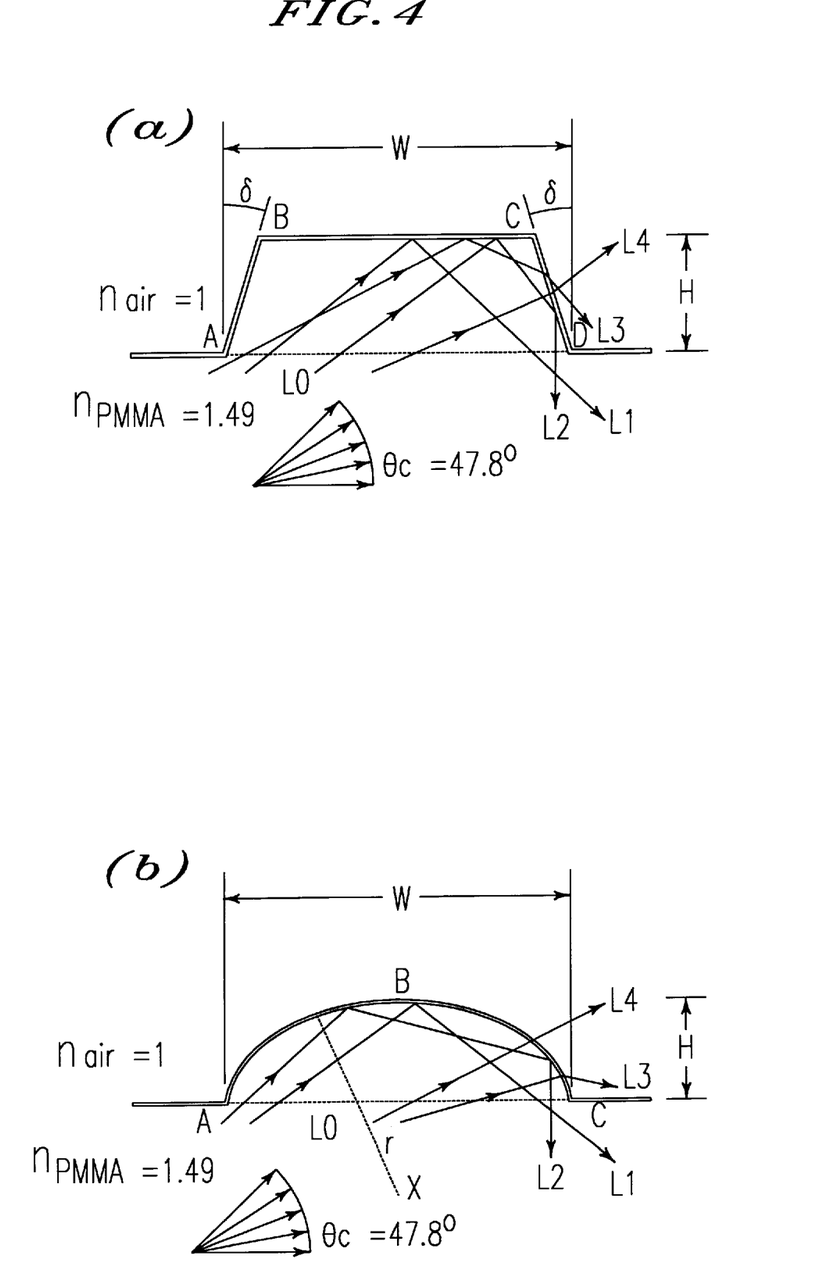
FIGS. 4a–4b are an explanatory diagram of ray tracking simulation of a protruding pattern whose cross section a circular arc and a protruding pattern whose cross section is triangular.
Figure 5:
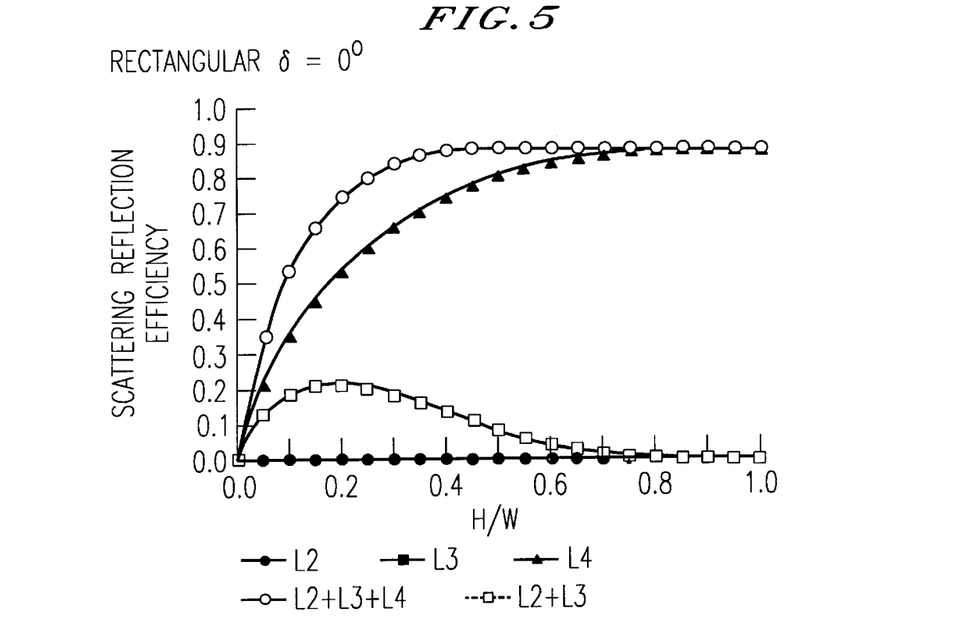
FIG. 5 is a graph showing a calculation result of the ray tracking simulation of the protruding pattern whose cross section is rectangular.
Figure 6:
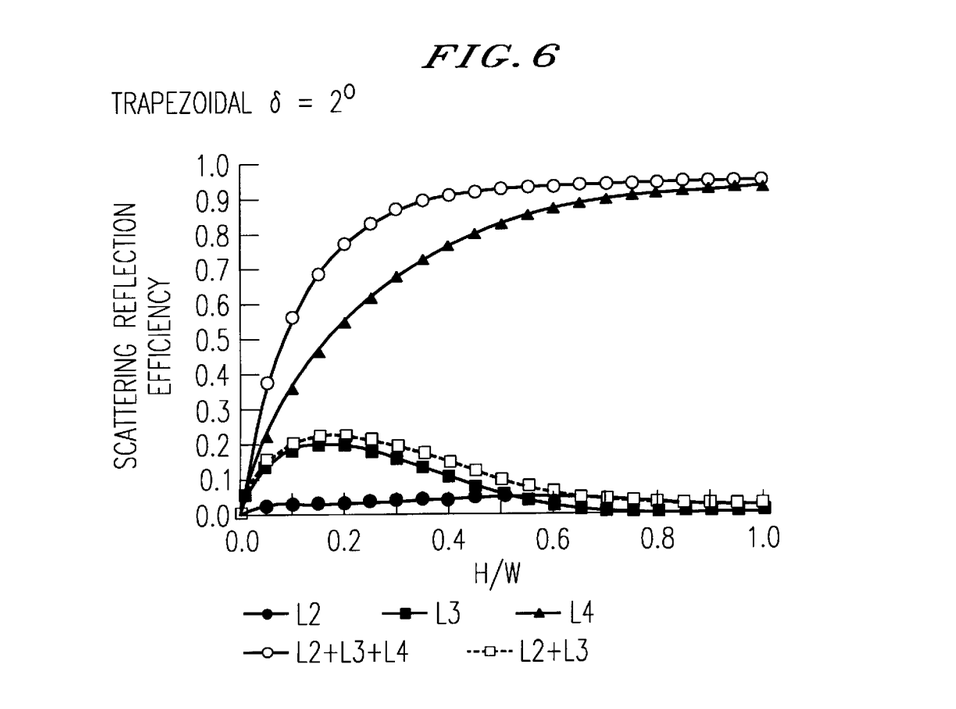
FIG. 6 is a graph showing a calculation result of the ray tracking simulation of the protruding pattern whose cross section is rectangular.
Figure 7:
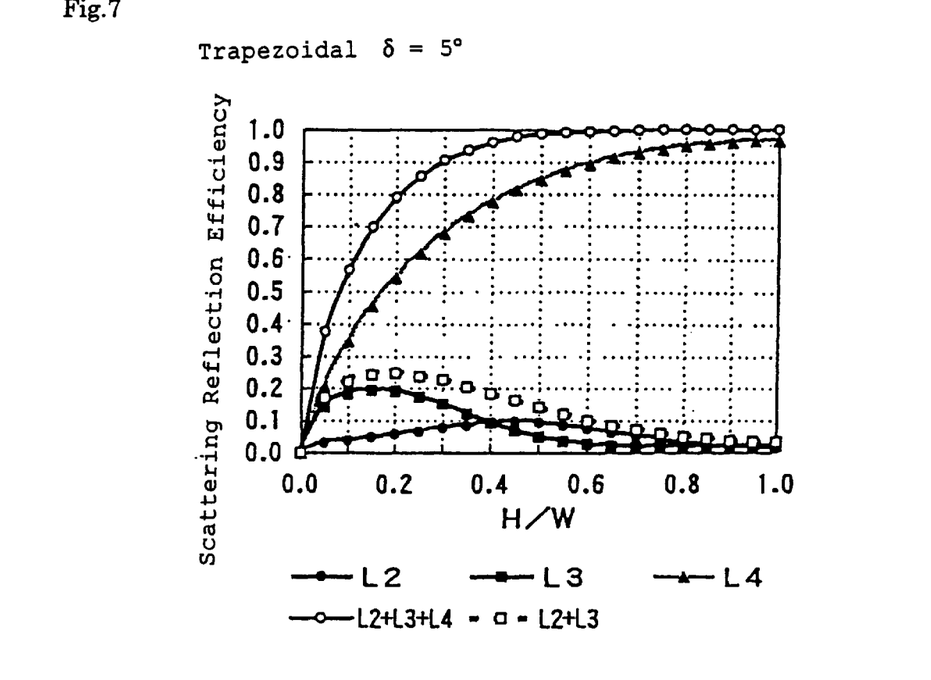
FIG. 7 is a graph showing a calculation result of the ray tracking simulation of the protruding pattern whose cross section is trapezoidal.
Figure 8:
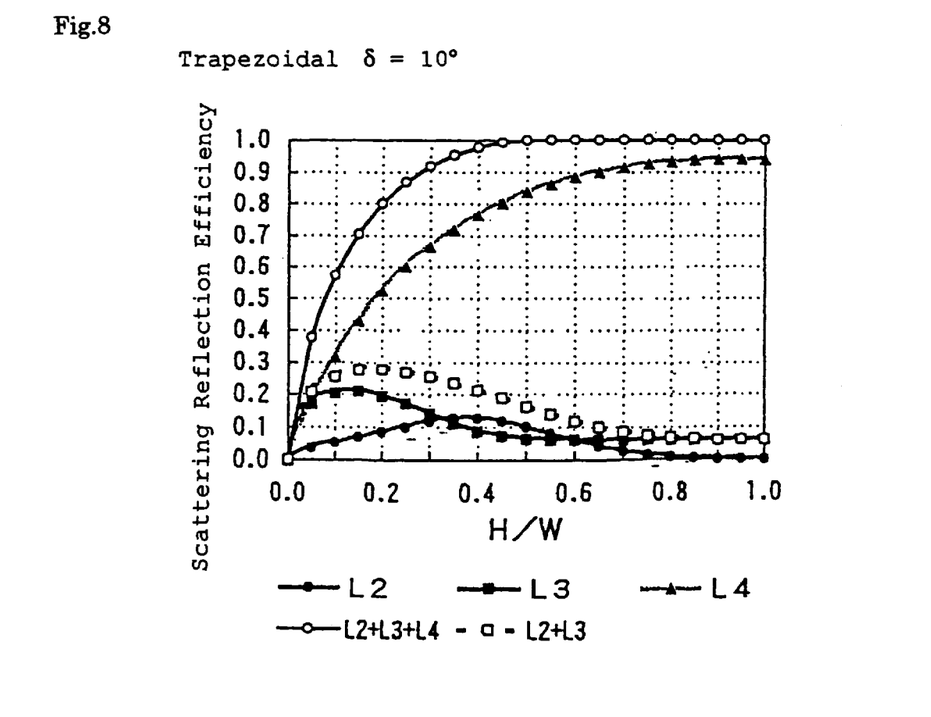
FIG. 8 is a graph showing a calculation result of the ray tracking simulation of the protruding pattern whose cross section is trapezoidal.
Figure 9:
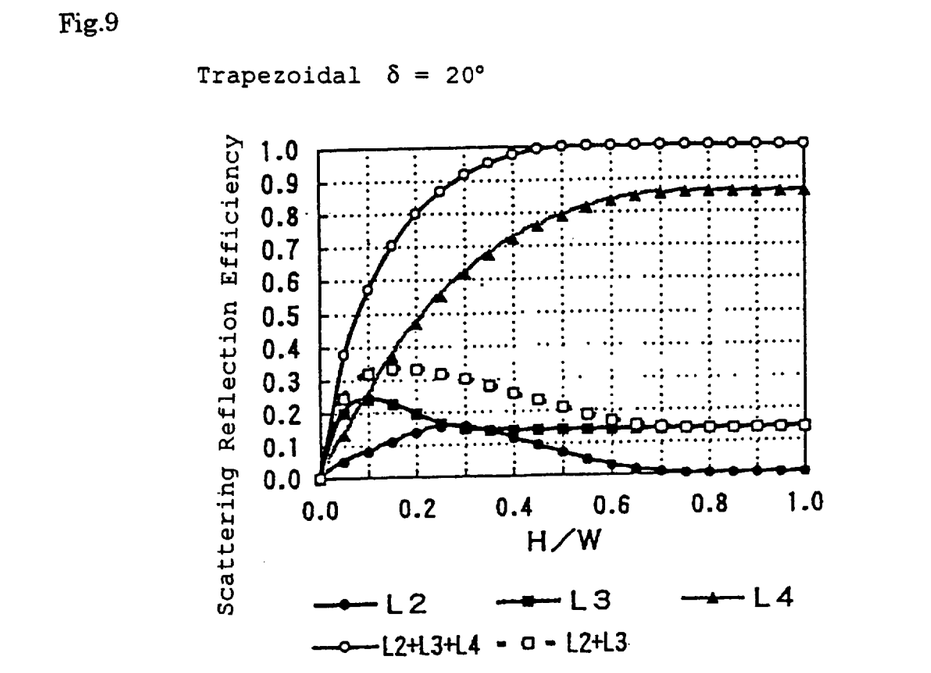
FIG. 9 is a graph showing a calculation result of the ray tracking simulation of the protruding pattern whose cross section is trapezoidal.
Figure 10:
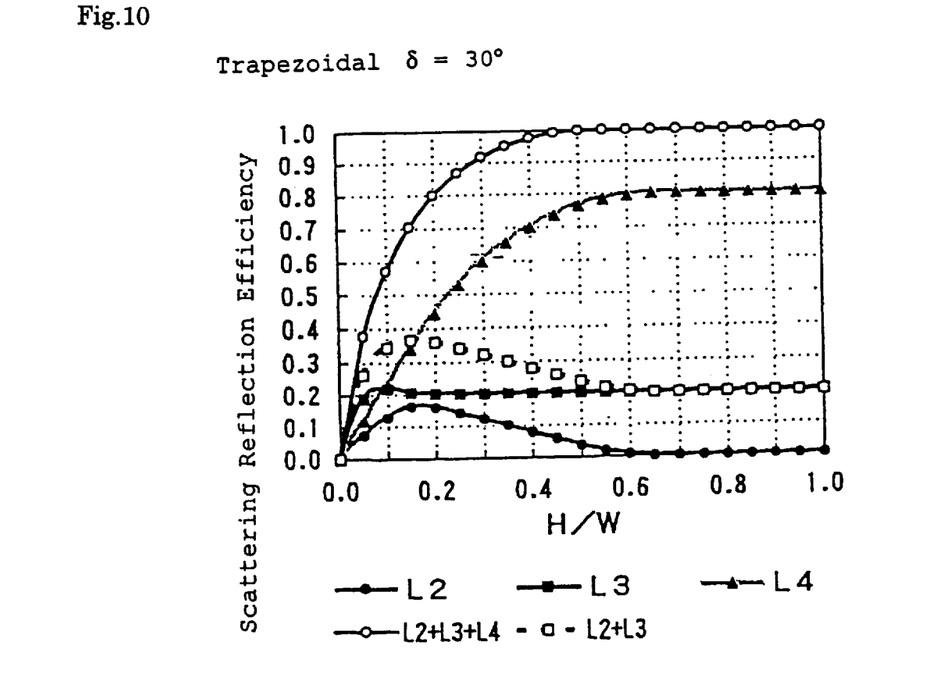
FIG. 10 is a graph showing a calculation result of the ray tracking simulation of the protruding pattern whose cross section is trapezoidal.

The inventors simulated the scattering reflection characteristics of unit pattern of a protruding pattern of acrylic lightguide as shown in FIG. 4 (refractive index of acryl: 1.49, refractive index of air: 1.00). It was calculated by changing height H with respect to width W in cases when the cross section is a trapezoid ABCD as shown in FIG. 4(a) and when the cross section is circular arc ABC as shown in FIG. 4(b). For the trapezoid (a), it was calculated also by changing the trapezoid slope angle δ. The ratio of the scattering light rays becoming L1 through L4 was calculated by assuming that the rays enter from the incident edge AD in case of the trapezoid (a) and enter from the incident edge AC in case of the circular arc (b) and by assuming that the rays enter evenly from an incident angle θ=0° to a critical angle θ=θc(=47.80). The incident rays L0 were inputted to the respective patterns by generating 10,000 uniform strength rays in total and by inputting from respective section points obtained by dividing respective incident edge into 100 equal parts as incident positions and with each equally divided angle obtained by dividing θ=0 to θc equally into 100 parts. The ratio with respect to the whole rays L0 was calculated by tracking the rays by calculating normal reflection and refraction at the interface with air where the patterns are created and by totaling as the scattering reflection rays L1 through L4.

Figure 11:
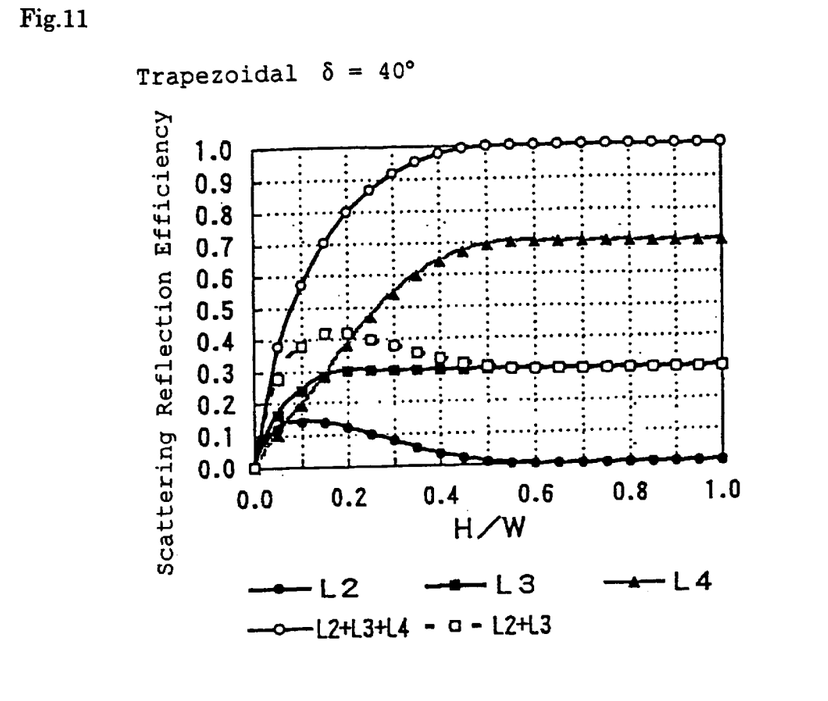
FIG. 11 is a graph showing a calculation result of the ray tracking simulation of the protruding pattern whose cross section is trapezoidal.
Figure 12:
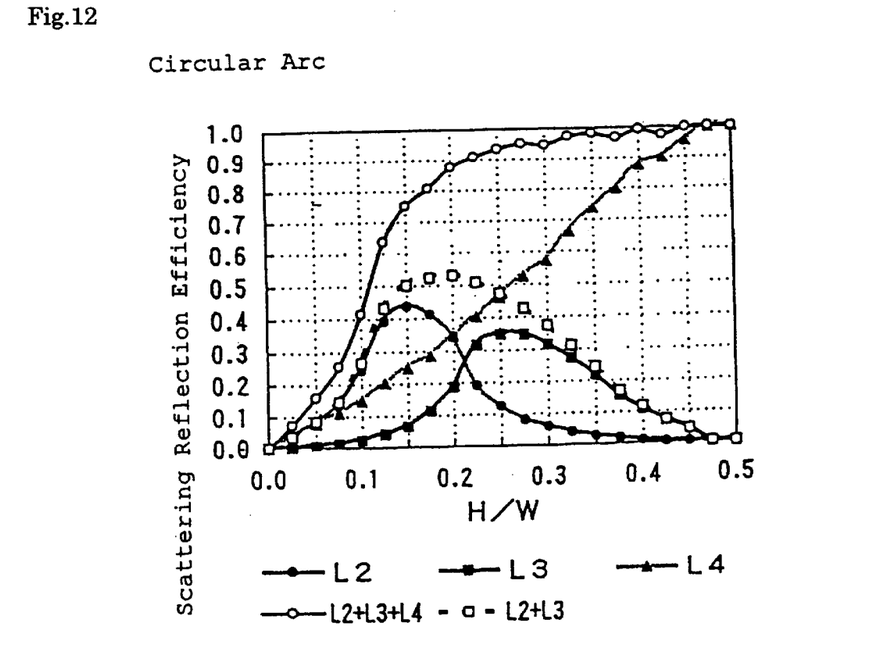
FIG. 12 is a graph showing a calculation result of the ray tracking simulation of the protruding pattern whose cross section is a circular arc.

The ratio of L1, L2, L3 and others to the whole incident rays L0 with respect to H/W which is the ratio between the width W and the height H of the pattern was calculated on each shape shown in FIG. 4 and its result on the trapezoidal pattern is shown in FIGS. 5 through 11 and its result on the circular arc pattern is shown in FIG. 12. The sum of respective ratios of L1+L2+L3 is a pattern scattering reflection efficiency (hereinafter denoted as η1) and a pattern having greater η1 is a preferable pattern having greater scattering reflection performance even if it is a small pattern.

While η1 increases monotonously when the height of the pattern is increased, i.e., the ratio H/W is increased, it saturates at certain H/W or more in each case. Because the lower the pattern, the easier to fabricate it in general, it indicates that there exists the optimum H/W when the convenience of production is taken into consideration.

When the cross section is trapezoidal (FIGS. 5 through 11), although the scattering reflection efficiency η1 does not increase more than 0.88 and the scattering efficiency is low even when H/W is increased in the rectangular pattern (FIG. 5), η1>0.8 in the trapezoidal patterns (FIGS. 7 through 11) whose slope angle δ≧5° when H/W≧0.2 and η1>0.95 when H/W≧0.3. Accordingly, it is a preferable pattern. When the cross section is circular arc (FIG. 12), η1>0.9 when H/W≧0.2 and η1>0.95 when H/W≧0.3. Accordingly, it is a preferable pattern having a high scattering reflection efficiency even if its height is low.

From the aspect of ray utility factor, the higher the ratio of L4 (hereinafter denoted as η2), the more preferable it is as it causes less loss. The greater H/W and the higher the height of the pattern, the greater the η2 also is. In cases of the rectangular pattern (FIG. 5) and the trapezoidal patterns (FIGS. 6 through 11), η2>0.4 when H/W≧0.2 and η2>0.6 when H/W≧0.3, except of the case when the slope angle of the trapezoid δ=40° (FIG. 11). Accordingly, they are preferable patterns. In case of the circular arc pattern (FIG. 12), η2>0.4 when H/W≧0.2 and η2>0.6 when H/W≧0.3. Accordingly, it is a preferable pattern.

While a pattern having the greater scattering reflection efficiency η1 is desirable, loss occurs when its ray utility factor η2 is low and it is not preferable in designing a highly luminous pattern distribution. That is, a preferable pattern is a pattern in which η1 and η2 are both high and the difference between the both is small. Further, when machining of a die, mold tranferability and mold releasability between the die and molded products are taken into consideration, although a fine pattern whose height H is low with respect to the cross-sectional width W of the pattern, i.e. a pattern whose H/W is small, may be readily fabricated, it is practically impossible to fabricate a pattern whose H/W is close to 1. Further, it is not suitable for production when the trapezoidal slope angle δ is small and when δ=0° in particular because it is difficult to release the molded products from the die. The followings are the preferable patterns which are excellent optically and which pose no problem in terms of production.

One is a protruding pattern whose cross section is almost trapezoidal and the ratio of its cross-sectional width W and height H is 0.2≦H/W≦1.0. More preferable pattern is one having the ratio of 0.3≦H/W≦0.8. When H/W<0.2, the ray utility factor η2 is low, so that the lightguide cannot be bright. When H/W>1.0, it is difficult to fabricate a die and the moldability also drops. Although the rectangular pattern (FIG. 5) is desirable optically because η1 and η2 are both high similarly, it is difficult to cut the die and to release the molded products from the die during molding because it has no sloped angle. Accordingly, a pattern whose cross section is approximately trapezoidal whose sloped angle δ is 2°≦δ≦30° or 5°≦δ≦20° in particular is preferable.

The other one is a protruding pattern whose cross section is approximately circular arc whose ratio of the cross-sectional width W and height H is 0.2≦H/W≦0.5. More preferable one is a pattern having 0.3≦H/W≦0.5 in which η1 and η2 are high and the difference thereof is small. When H/W<0.2, the ray utility factor η2 is low and a highly luminous lightguide cannot be obtained. As for the die and the moldability, it may be readily fabricated because H/W is low when 0.2≦H/W≦0.5.

(2) Providing Scattering Reflection Patterns on Emitting Surface:

While the scattering reflection patterns are provided on the emitting surface in the present invention, the reason why the luminance is higher in this case than the case of disposing the patterns on the rear surface which is a surface facing to the emitting surface as in the past will be explained. Ones in which the lightguide 3 is put up-side down in FIGS. 1 through 4 correspond to those in which the patterns are provided on the rear surface and have large ray utility factor η2 as L2 and L3 in FIG. 3 are emitted without being reflected by the reflection sheet on the rear surface and their loss is small. L4 becomes emitted light whose ray utility factor η2 is low as it is emitted by being reflected by the reflection sheet. That is, as for the ray utility factor η2, while L4 is important when the patterns are provided on the emitting surface side of the present invention, L2+L3 is important when the patterns are provided on the rear surface. The condition that L2+L3+L4 represent the scattering reflection efficiency η1 of unit pattern is the same. The ratio of L4 is much larger than the ratio of L2+L3 when the cross section of the pattern is trapezoidal (FIGS. 5 through 11) and is circular arc (FIG. 12) and when H/W is greater than 0.2 to 0.3 in particular. Accordingly, the bright lightguide whose ray utility factor η2 is high may be obtained by providing the patterns on the emitting surface side.

Figure 13:
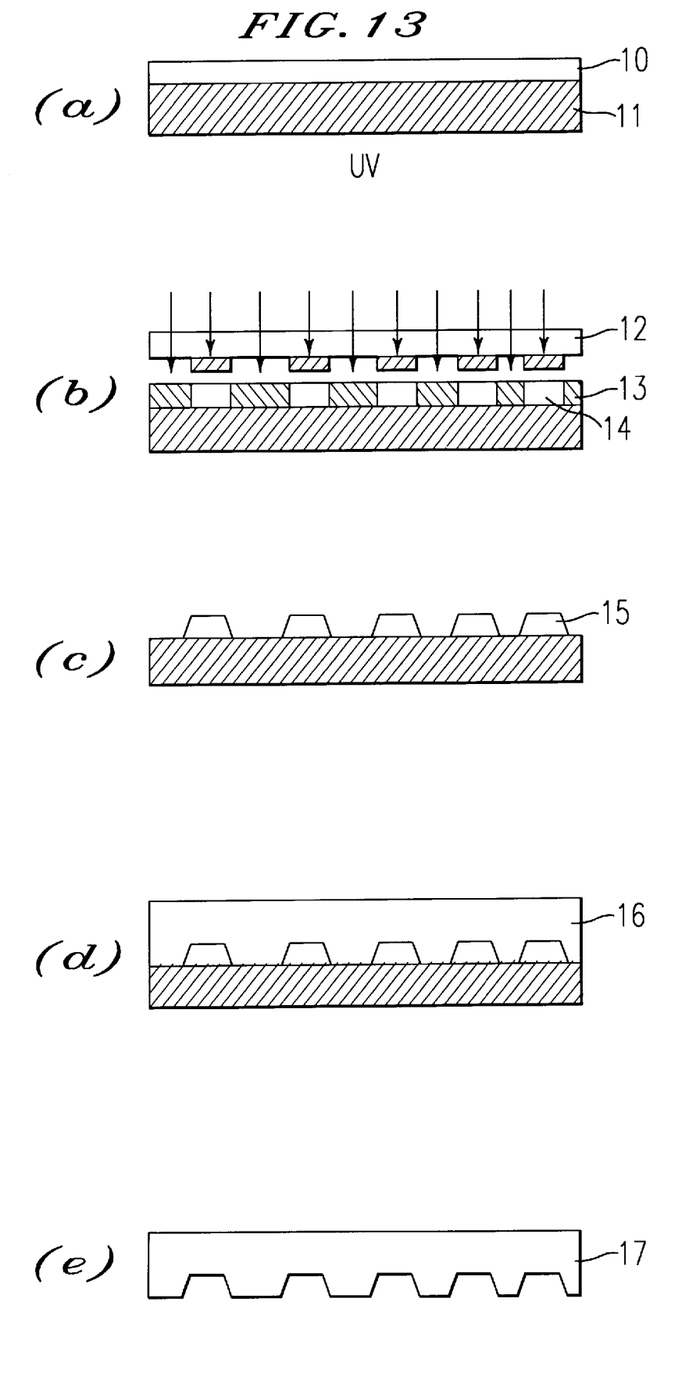
FIGS. 13a–13e are an explanatory diagram showing a method for fabricating a die of the patterns whose cross section is convex by using photo-lithography.

(3) Fine Patterns:

Hitherto, there has been a problem that the local luminous unevenness caused by individual patterns cannot be uniformed and that moire is produced among a prism sheet and a liquid crystal panel disposed thereon when the patterns are provided on the emitting surface side even if the diffusion sheet or the like is disposed on the emitting surface side because the pitch of the scattering reflection patterns is as rough as about 1 mm due to the restriction of printing accuracy in dot printing and of machining accuracy of mechanical machining. Therefore, it has been a general practice to provide the scattering reflection patterns on the rear surface facing to the light emitting surface. It is possible to avoid this problem by providing fine patterns at fine pitch. The present inventive protruding patterns may be formed finely by using photo-lithography as shown in FIG. 13 and may be molded by a die. At first, (a) resist is applied by means of spin-coating or the like on a substrate such as glass so as to have a predetermined thickness. Next, (b) patterns are exposed on the resist film by directly lithographing predetermined patterns by an electron beam or laser lithography system or by overlaying a photomask on which predetermined patterns are lithographed on the resist film and by exposing ultraviolet rays. Then, (c) the resist patterns are formed on the substrate such that its cross section protrudes in a trapezoidal shape for example by developing the resist film on which the patterns are exposed. The height of the pattern at this time is determined by the thickness of the spin-coating. (d) While the process advances to electroforming in the next step when the cross section is trapezoidal, the trapezoidal resist pattern may be readily deformed into the circular arc pattern by post-baking the trapezoidal resist pattern by an oven or the like before the electroforming step when the pattern whose cross section is circular arc is to be formed. (e) After implementing a conductive process on the pattern surface, a molding die 17 in which the patterns are provided is obtained by nickel electroforming or the like. The lightguide on which the fine scattering reflection patterns are formed may be fabricated by means of injection molding or press molding by using this die and the transparent material such as acryl.

As for the pattern lithography, because the electron beam lithographic method has a lithographic accuracy of about 0.1 μm and the laser beam lithographic method also has an accuracy of 1 to 2 micron, the die on which any fine and planar patterns of about several tens μm are created may be formed readily and at high precision. Although the width W of the pattern may be arbitrarily set at several μm or more, it is preferable to be fully large so as not to produce interference color due to the fine structure (see JP-A-6-160636) and to be fully small so as to keep the luminous unevenness inconspicuous. It is then preferable to be 5 to 300 μm or to be 10 to 200 μm. The height of the resist pattern, i.e., the height H of the circular arc pattern, may be readily controlled by the thickness of the spin-coating and may be set at several to 30 μm for example. The trapezoid slope angle δ may be controlled to be δ=5 to 40° depending on the exposure or developing conditions by interposing a spacer between the photomask and the resist substrate. The pattern whose cross section is approximately circular arc may be formed by treating it by heat.

Although it is not intended to limit the manufacturing method in practicing the present invention, such photo-lithographic technology allows a large number of fine patterns whose cross section is trapezoidal or circular arc having an arbitrary planar shape, which could not be formed readily by the conventional pattern machining methods such as mechanical cutting, laser processing and chemical etching, to be formed in a large screen at high precision, with good reproducibility, readily and at low cost.

(4) Surface Accuracy:

It is important for the level surface 3b of the lightguide to be specular to totally reflect the light and to guide the light far from the light source without causing loss by scattering. It is preferable, also in this aspect, to keep the roughness of the emitting surface of the level surface 3b of the molded product to be less than 0.2 μm by using the glass substrate having a high specular accuracy as the resist substrate. Further, while smoothness and reproducibility of a plane corresponding to the protruding surface of the circular arc pattern or to a straight part at the apical edge of the trapezoid are important as for the scattering reflection efficiency, the ray utility factor or the reproducibility of the patterns, the plane formed by spin-coating or the like is very smooth and this smoothness is kept also after the exposure and developing processes. It is possible to obtain the better smoothness when the protruding resist pattern is deformed into the circular arc pattern by implementing the post-baking or the like. That is, the protruding surface of the trapezoid and the protruding surface of the circular arc having the good specular surface whose emitting surface roughness is less than 0.2 μm may be formed readily with good reproducibility.

Figure 14:
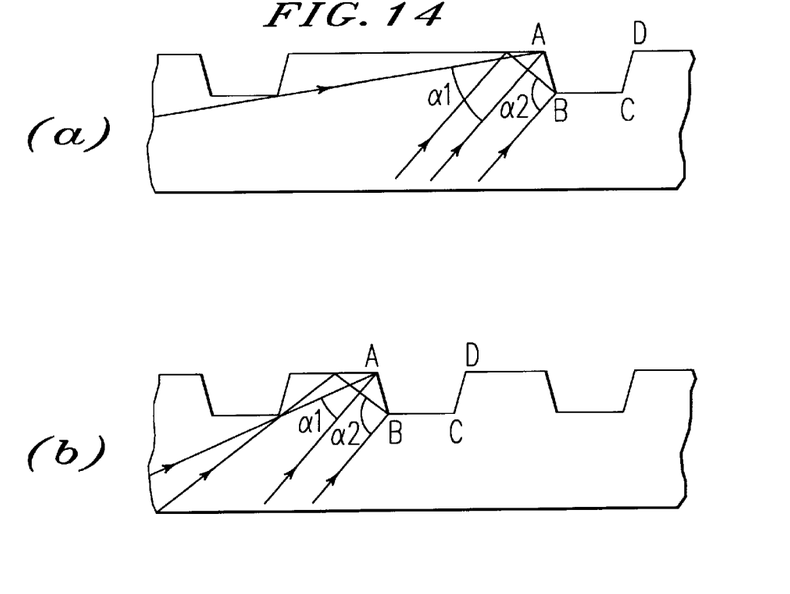
FIGS. 14a–14b are explanatory diagram of a ray tracking of a lightguide having concave patterns whose cross section is a circular arc.

(5) Advantage of Protruding Pattern:

The scattering reflection characteristic of the unit circular arc protruding pattern and the trapezoidal protruding pattern may be found by considering only the rays incident on the opening of the protruding pattern provided based on the scattering reflection surface 3b, i.e., the edge AD of the trapezoid ABCD in FIG. 4(a) and the edge AC of the circular arc ABC in FIG. 4(b), as described above and the pattern density may be readily designed to uniform the luminance because the neighboring patterns influence less even if the patterns are disposed densely. However, it is complicated in case of concave patterns. FIG. 14 is an explanatory diagram of ray tracking in case of the trapezoidal concave patterns, wherein FIG. 14(a) shows a case when the patterns are disposed at a low density and FIG. 14(b) shows a case when they are disposed at a high density. Noticing on the trapezoid ABCD, i.e., the unit pattern in each, what is effective for the scattering reflection is an edge AB and the edge AB corresponds to the opening of the protruding pattern described above, i.e., the edge AD in FIG. 4(a). In case of FIG. 14(a) in which the density is low, rays which can be incident around the point A of the edge AB are those within the range of angle a1 and rays within the range of angle a2 can be incident around the point B. The same applies also to each incident point at the intermediate section of the edge AB. While the total of all rays which can be incident on the edge AB corresponds to the opening of the concave pattern ABC, it is apparent that the opening of (b) is smaller than that of (a) because the patterns adjoin each other. While the above-mentioned case is that of the trapezoidal concave pattern, the same applied also to the case of the circular arc concave pattern. That is, the scattering reflection performance of the unit pattern is highly efficient when the pattern density is low and is low when the pattern density is high. That is, the scattering reflection performance of the unit pattern changes in complex depending on the disposing density of the patterns. Because the concave patterns accompany such complexity, it becomes very difficult to design the pattern density to uniform the luminance.

When the diffusion sheet or the scattering reflection sheet having minute irregularity is contacted on the level surface of the lightguide interfacing with air, light scatters and leaks out of the lightguide system at the contact point in general. This condition changes largely not only by the condition of the minute irregular emitting surface of the diffusion sheet or the reflection sheet but also by pressure. The general rear surface-light is constructed while containing such condition and the uniform luminance as a surface light source may become unstable. While the level surface $3b$ having no pattern on the pattern forming plane is important for the guided light and is desirable to have no such unstableness, the level surface $3b$ does not contact with the diffusion sheet or the reflection sheet when the pattern is the protruding pattern from this aspect. The protruding pattern is better from such reasons.

(6) About Density Distribution of Patterns:

The density distribution is designed by lowering the density of patterns at the region close to the primary light source and by increasing it at the region far from the light source in order to uniform the luminance as a surface light source in general. Although it is not intended to confine the distribution of patterns in the present invention, the following points are important in designing the distribution of patterns.

Firstly, it is advantageous to provide the density distribution by changing intervals of speckled, chain line shaped and linear unit patterns having the same plan shape in designing the patterns to uniform the luminance, by the following reasons. At first, there is a problem in terms of the shape of the lightguide itself. Next, the lightguide cannot be fabricated in accordance to a theory in mechanical process or in photo-lithography due to a problem of pattern shaping accuracy. Parameters cannot but be decided empirically by improving the machining reproducibility, by repeatedly making prototypes in trial and by evaluating the distribution of luminance in the initial stage. In such a case, the scattering reflection performance of individual pattern changes in complex when the plan shape of the pattern is changed as shown in FIG. 1(b) or when the shape and size of the cross section are changed as shown in FIGS. 5 through 12 for example, uncertain factors increase in addition to the problems of the machining accuracy and the reproducibility, so that it becomes difficult to design the lightguide having uniform luminance.

Secondly, a pattern having a high scattering reflection performance and emitting all the rays incident on each pattern as much as possible from the emitting surface without loss is preferable by the following reasons. The scattering reflection performance required per unit area of the scattering reflection surface of the lightguide may be given by increasing the size of the pattern relatively even if it is a pattern having a low scattering reflection performance as long as it is a pattern which causes less loss and through which pattern incident light becomes propagating light again. However, although it is necessary to design the lightguide so that the propagating light of the lightguide is emitted effectively by increasing the scattering reflection performance per unit area at the region far from the primary light source in particular, the scattering reflection performance is insufficient in such case and it becomes impossible to design a highly efficient pattern distribution. Because the areal density of the patterns cannot be set at 100%, the scattering reflection performance cannot be set at 100% even if the highly efficient unit patterns having large H/W in FIGS. 5 through 12 are disposed densely as much as possible. It is desirable to design the patterns so as to emit the most of light across the region close to and far from the light source and to emit the remaining light at the region far from the light source by giving scattering reflection distribution close to 100% in order to design the high luminous pattern. The limitation within which the irregular patterns can be disposed at a high density in fabricating a die or in molding depends on the height of the pattern and the distance to the adjoining pattern can be reduced by only about the height of the pattern. It is preferable to increase the width W of the pattern with respect to the height H of the pattern to adjoin each other in order to dispose them at a high density under such restriction. It is also possible to deal with the case of finely adjusting the patterns in order to uniform the luminous unevenness in the direction parallel to the axial direction of the light source 1 in FIG. 1(a) by increasing/reducing the size and the width of the unit pattern.

As described above, it is rational to design and to dispose the unit patterns having the high scattering reflection efficiency and the same shape by changing the intervals at first in designing the pattern distribution and to increase/decrease the pattern shape and the pattern width to increase the luminance to the limit and to correct slight luminous unevenness.

From such reasons, it is preferable to design the lightguide such that the large number of speckled, solid-line shaped or broken-line shaped protruding patterns whose cross-sectional width W ($\mu$m) at the cross section perpendicular to the axis of the linear light source is $10 \leq W \leq 200$ are arranged. Further, those in which the cross section of the protruding pattern is approximately trapezoidal and having a straight part partially and the ratio H/W is $0.2 \leq H/W \leq 1.0$, where W and H denote the cross-sectional width and height of the protruding pattern, respectively, or in which the cross section of the protruding pattern is approximately circular arc and the ratio H/W is $0.2 \leq H/W \leq 0.5$, where W and H denote the cross-sectional width and height of the protruding pattern, respectively, are rational and preferable.

BEST MODE FOR CARRYING OUT THE INVENTION

The present invention will be explained in detail based on embodiments.

(First Embodiment)

Figure 15:
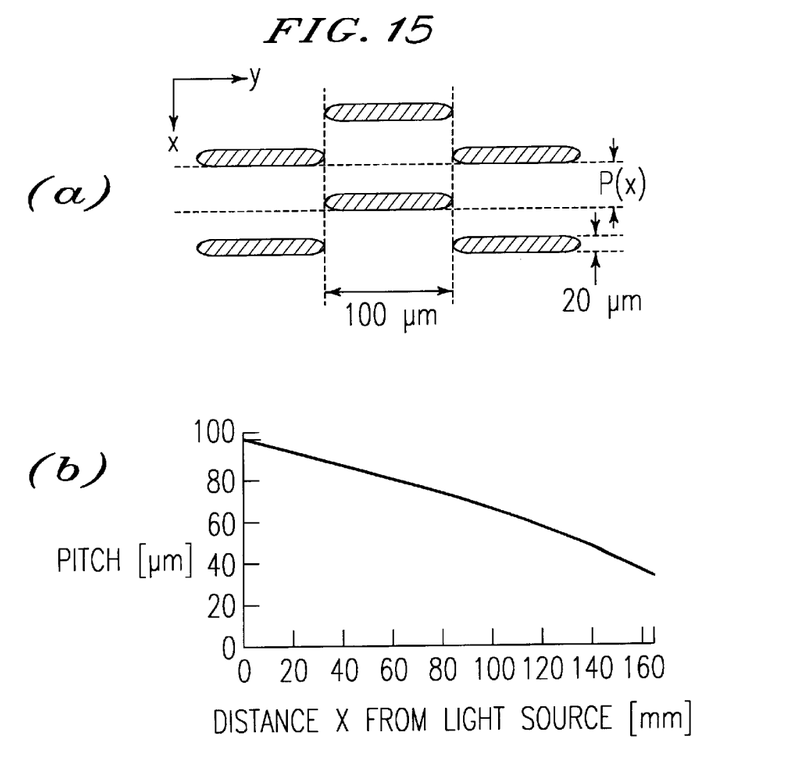
FIGS. 15a–15b are diagram showing one example of pattern design of the lightguide based on the present invention.

A photomask made of glass having patterns as illustrated in FIG. 15 was formed by setting the cross-sectional width W of unit pattern at 20 $\mu$m, the ratio H/W at 0.5 and the pattern height H at 10 $\mu$m and by designing the density distribution of patterns whose cross section is approximately trapezoidal and suitable for the scattering reflection performance. A positive type photoresist was spin-coated on a glass substrate and the photomask was overlaid on the photoresist to expose by ultraviolet rays of a predetermined quantity of light. It was then developed by using developer and a resist pattern whose cross-sectional height is 10 μm and whose shape is approximately trapezoidal was formed on the glass substrate. Nickel sputtering was implemented in a thickness of several tens nm on this resist surface to implement a conductive process and nickel electroforming was implemented in a thickness of 300 μm to fabricate a die. Acrylic lightguides whose size is 10.4 inches, whose thickness of a light receiving end on the long edge side is 3.0 mm, whose thickness of the opposing ends is 1.1 mm, i.e., whose cross-sectional shape is tapered, and in which a large number of trapezoidal protruding patterns are created at the lower surface such that the cross-sectional shape of the patterns have the designed height as shown in FIG. 15 was obtained. The results turned out as shown in Table 1 (first embodiment). The cross-sectional shape of the large number of patterns was almost the same, there was no problem in terms of the pattern transferability and they could be readily released from the die. When the lightguide was observed visually from the emitting surface side on which the protruding patterns are created by setting a cold cathode ray tube of 2.6 mm in diameter on the end plane of the lightguide at the thicker and longer edge side as the primary light source and by placing the reflection sheet on the rear surface, no local luminous unevenness caused by the roughness of the patterns was observed, the luminance was uniform and no rainbow pattern or the like caused by interference was also observed. Further, when the distribution of luminance was measured by disposing the diffusion sheet and one prism sheet on the emitting surface, the lightguide had the good luminous uniformity as the surface light source as shown in Table 1 and was a bright and uniform lightguide whose average luminance is also high.

(Second Embodiment)

A photomask made of glass was formed by setting the cross-sectional width W of unit pattern at 150 μm, the ratio H/W at 0.2 and the pattern height H at 30 μm and by designing the density distribution of patterns whose cross section is approximately trapezoidal and suitable for the scattering reflection performance. A die was fabricated in the same manner with the first embodiment to mold an acrylic lightguide having a size of 10.4 inches similarly to the first embodiment. The results turned out as shown in Table 1 (second embodiment) and the transferability and the releasability were good. When the primary light source was set in the same manner with the first embodiment to observe the emitting surface on which the protruding patterns are provided, divisions of the patterns could be discriminated slightly. However, when the diffusion sheet and the prism sheet were disposed by one each, the divisions of the patterns disappeared and no moire of the lightguide patterns and the prism sheet was observed. It turned out to be a lightguide whose uniformity and average luminance are good.

(Third Embodiment)

A photomask of patterns was formed by setting the cross-sectional width W of unit pattern at 20 μm, the ratio H/W at 0.5 and the pattern height H at 10 μm and by designing the density distribution of patterns whose cross section is approximately circular arc. Resist was developed in the same manner with the first embodiment to form a resist pattern having an approximately trapezoidal shape. Then, the resist pattern whose cross section is approximately circular arc was created and a die was created by post-baking at a predetermined temperature for a predetermined time. An acrylic lightguide having the same size with that of the first embodiment was molded by this die. The results turned out as shown in Table 1 (third embodiment) and the transferability and the releasability were good. It turned out to be a lightguide whose uniformity and average luminance are good.

(Fourth Embodiment)

An approximately circular arc resist pattern was formed by setting the cross-sectional width W of unit pattern at 150 μm, the ratio H/W at 0.2 and the pattern height H at 30 μm and by designing patterns whose cross section is approximately trapezoidal and which are suitable for the scattering reflection performance. It was molded after obtaining its die. It turned out to be a lightguide whose moldability is good and whose luminous uniformity and average luminance are good.

FIRST COMPARATIVE EXAMPLE

Luminance of the lightguide comprising the trapezoidal protruding patterns molded in the first embodiment was measured by setting to the primary light source by putting the patterned surface on the rear side, by disposing the reflection sheet which is the same one with that of the first embodiment on the rear surface and by disposing the diffusion sheet and the prism sheet on the emitting surface. Its result was that the average luminance is lower than that of the first embodiment as shown in Table 1 (first comparative example).

SECOND COMPARATIVE EXAMPLE

Luminance of the lightguide comprising the circular arc protruding patterns molded in the third embodiment was measured by putting the patterned surface on the rear side similarly to the first comparative example. Its result was that the average luminance is lower than that of the third embodiment as shown in Table 1 (second comparative example).

THIRD COMPARATIVE EXAMPLE

A pattern whose cross section is approximately trapezoidal and which is suitable for the scattering reflection performance was designed by setting the cross-sectional width W of unit pattern at 5 μm, the ratio H/W at 0.6 and the pattern height H at 3 μm and a die was fabricated to mold it in the same manner with the first embodiment. Although its moldability was good, it was unsuitable as a white surface light source because interference color was observed when the primary light source was set and the interference color did not disappear completely even when the diffusion sheet was disposed.

FOURTH COMPARATIVE EXAMPLE

A pattern whose cross section is approximately trapezoidal and which is suitable for the scattering reflection performance was designed by setting the cross-sectional width W of unit pattern at 250 μm, the ratio H/W at 0.1 and the pattern height H at 25 μm and a die was fabricated to mold it in the same manner with the first embodiment. Although its moldability was good, the roughness of the divisions of the patterns was conspicuous when the primary light source was set, the local luminous unevenness did not disappear even when the diffusion sheet was disposed and moire occurred when the prism sheet was placed. Then, it did not become an uniform surface light source.

The above results may be summarized as shown in Table 1.

TABLE 1

|  |  | Embodiments | | | | Comparative Examples | | | |
| --- | --- | --- | --- | --- | --- | --- | --- | --- | --- |
|  |  | 1 | 2 | 3 | 4 | 1 | 2 | 3 | 4 |
| Pattern Forming Surface |  | Emitting Surface | Emitting Surface | Emitting Surface | Emitting Surface | Back Surface | Back Surface | Emitting Surface | Emitting Surface |
| Cross-Sectional Shape |  | Trapezoidal | Trapezoidal | Circular Arc | Circular Arc | Trapezoidal | Circular Arc | Trapezoidal | Trapezoidal |
| Cross-Sectional Width W | ($\mu$m) | 20 | 150 | 20 | 150 | 20 | 20 | 5 | 250 |
| Cross-Sectional Height H | ($\mu$m) | 10 | 30 | 10 | 30 | 10 | 10 | 3 | 25 |
| H/W |  | 0.5 | 0.2 | 0.5 | 0.2 | 0.5 | 0.5 | 0.6 | 0.1 |
| Trapezoid Cross-Sectional Slope Angle δ | (°) | 20 | 25 | — | — | 20 | — | 20 | 25 |
| Moldability |  | ◉ | ◉ | ◉ | ◉ | ◉ | ◉ | ◉ | ◉ |
| Pattern Interference Color | ◉ | ◉ | ◉ | ◉ | ◉ | ◉ | ◉ | X | ◉ |
| Minuteness of Patterns (Local Uniformity) |  | ◉ | ◯ | ◉ | ◯ | ◉ | ◉ | ◉ | × |
| Average Luminance | (cd/m²) | 1,850 | 1,780 | 1,880 | 1,820 | 1,680 | 1,630 | 1,550 | 1,470 |
| Uniformity Ratio of Illuminance | (%) | 90 | 93 | 85 | 88 | 75 | 70 | 80 | 82 |

Industrial Applicability

As described above, the present inventive lightguide is highly luminous and is excellent in terms of the luminous uniformity and may be used effectively as a rear surface illuminator of a liquid crystal display of a word-processor, a personal computer, a thin-type television set and the like.

What is claimed is:

1. A lightguide for guiding light from at least one side end plane, said lightguide comprising:

a main body made of a transparent material, wherein said main body is approximately trapezoidal in cross-section so that said main body has a level surface and a rear surface, said rear surface being at an angle with respect to said level surface; and a multiplicity of any one of a speckled protruding pattern, a solid-line shaped protruding pattern, and a broken-line shaped protruding pattern located so as to protrude outwardly from said level surface of said main body, wherein any one of said speckled protruding pattern, said solid-line shaped protruding pattern, and said broken-line shaped protruding pattern has a cross-sectional width W located at a cross-section thereof so as to be perpendicular to an axis of a linear light source and said cross-sectional width W is approximately within a range defined by 10 $\mu$m≦W≦200 $\mu$m, said level surface constituting a light emitting surface, at a low density, in a region close to the linear light source, and at a high density, in a region far from the linear light source, so as to make a luminance distribution of light emitted from said light emitting surface approximately uniform.

2. The lightguide described in claim 1, wherein said cross-section of any one of said speckled protruding pattern, said solid-line shaped protruding pattern, and said broken-line shaped protruding pattern is approximately trapezoidal, while having a straight part partially, and the ratio H/W is 0.2≦H/W≦1.0, where W and H denote cross-sectional width and height of the protruding pattern, respectively.

3. The lightguide described in claim 1, wherein said cross-section of any one of said speckled protruding pattern, said solid-line shaped protruding pattern, and said broken-line shaped protruding pattern is approximately a circular-arc and aid ratio H/W is 0.2≦H/W≦0.5, where W and H denote cross-sectional width and height of the protruding pattern, respectively.

* * * * *